Dec. 5, 1950     C. E. BRICKER ET AL     2,533,186

RUBBER BUSHING FOR LINK MOUNTED BRAKES

Filed Aug. 30, 1948     2 Sheets-Sheet 1

INVENTORS
CARL E. BRICKER
DONALD D. NEFF
BY
ATTORNEY

Dec. 5, 1950  C. E. BRICKER ET AL  2,533,186
RUBBER BUSHING FOR LINK MOUNTED BRAKES
Filed Aug. 30, 1948  2 Sheets-Sheet 2

INVENTORS
CARL E. BRICKER
DONALD D. NEFF
BY
ATTORNEY

Patented Dec. 5, 1950

2,533,186

UNITED STATES PATENT OFFICE 2,533,186

RUBBER BUSHING FOR LINK MOUNTED BRAKES

Carl E. Bricker, Akron, and Donald D. Neff, Uniontown, Ohio, assignors to Wingfoot Corporation, Akron, Ohio, a corporation of Delaware Application August 30, 1948, Serial No. 46,914

2 Claims. (Cl. 188—73)

This invention relates to mounting means for link mounted brakes, especially to resilient bushings or bearings adapted to be used in positioning spot type of brakes on frames for brake action.

The present invention relates to brake constructions of the type that are disclosed in and covered by the co-pending application of Carl E. Bricker, S. N. 754,705, filed June 14, 1947. This patent application covers a single-disc, pressure type of brake and special mountings for the same. Such mounting means primarily comprise a U-shaped adapter link which positions a roughly C-shaped, brake housing member thereon by engaging a base portion of the housing between arms of the link. A base section of the adapter link is, in turn, pivotally supported by and between the arms of a yoke member which is adapted to be secured to a vehicle. The pivotal connections of the brake housing member to the adapter link, and of the link to the yoke both provide movable joints which, in operation, have proven excellent for achieving uniform brake action but which also are somewhat difficult to control insofar as undesired noise and looseness in the brake member are concerned.

It is the general object of the present invention to provide a new and improved type of mounting means for spot type brakes of the class described.

Another object of the invention is to provide resilient mounting means or bushings for brakes of the class described wherein the resilient bushings will snugly position the associated brake parts when not operating and will flow out of their normal position on brake application so that the bushings will be temporarily distorted to permit metal to metal contact in the brake mounting means while braking action is being effected.

A further object of the invention is to provide a mounting construction for brakes of the class described wherein the mounting is adapted to have a long service life with a minimum of maintenance.

Another object of the invention is to provide relatively inexpensive, easily assembled mounting bushings for spot type brakes.

Another object of the invention is to provide a noiseless mounting for brakes of the class described.

Yet another object of the invention is to provide a mounting for a spot type brake that aids in reestablishing brake clearance upon brake release.

The foregoing objects and other objects and advantages of the invention will be made more apparent as the specification proceeds.

Attention is now particularly directed to the accompanying drawing, wherein.

Figure 1:
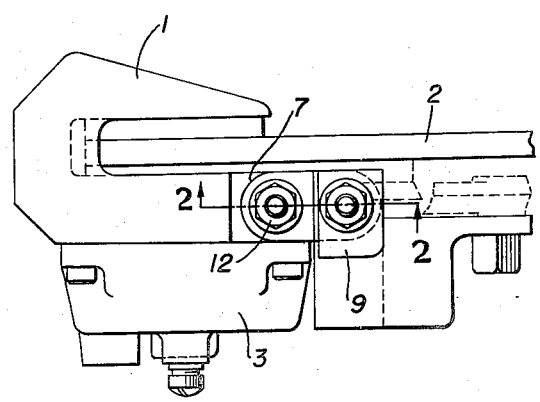
Fig. 1 is a side elevation of a brake embodying the principles of the invention.

Reference is now made to the details of the construction shown in the accompanying drawings, a substantially C-shaped brake housing member 1 is provided which is adapted to receive a brake disc 2 in the mouth portion of the brake housing. Control means 3 are shown in Fig. 1 and these means control the operation of the braking means carried by the brake housing member 1, though not shown in detail herein. The brake housing 1 is provided with a base portion 4 which has a bore 5 extending therethrough for use in mounting the housing member 1.

In order to position the brake housing member 1 for desirable brake action, all as explained in more detail in the above referred to application of Carl E. Bricker, the brake housing member 1 is received between and positioned by a substantially U-shaped adapter link 6 which has arm or leg portions 7 thereon which are in spaced but parallel association and receive the base portion 4 of the brake housing therebetween. The adapter link 6 is itself positioned between arms 8 of a yoke member 9 that is adapted, normally, to engage rigidly with a vehicle frame or other member for operatively positioning the brake unit of the invention.

Figure 2:
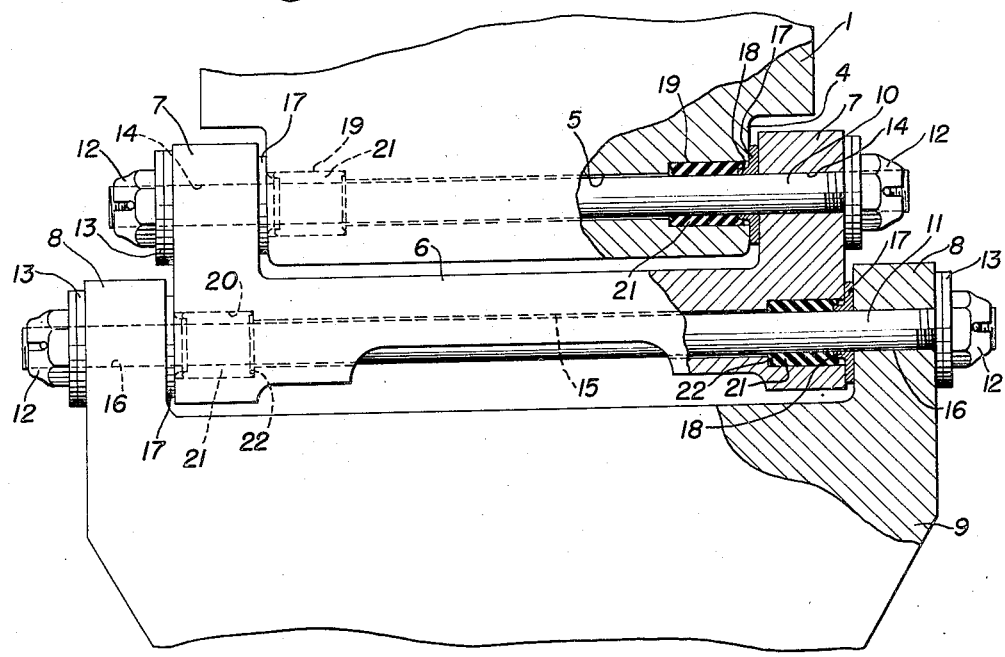
Fig. 2 is an enlarged detailed section taken on line 2—2 of Fig. 1.

Fig. 2 shows that bolts 10 and 11 may be used to secure the brake housing 1 to the adapter link 6, and the adapter link 6 to the yoke 9, respectively, for pivotal movement thereon. These bolts 10 and 11 have conventional castle nuts 12 secured to the ends thereof and may have lock washers 13 or other similar devices associated therewith for retaining the nuts in locked association with the bolts. Bores 14 are shown formed in the arms 7 for receiving the bolt 10 therein, whereas a bore 15 is formed in the base of the adapter 6 for engaging with the bolt 11 that in turn passes through bores 16 formed in the arm portions of the yoke 9.

It will be realized that when braking forces are set up in the brake housing 1, such forces will tend to set up a rotational movement in such housing member substantially parallel to the brake disc 2. Thus, the means positioning the brake housing member 1 will be subjected to a longitudinal turning moment set up by the brake housing member and the bolts 10 and 11, or other means used to position the mounting means of the brake, will be subjected to rotational moments that, in general, fulcrum at one end of the mounting device and tend to cause the opposite end of the mounting device to rotate about the first mentioned end of such a device. In all events, the bolts 10 and 11 both will have turning moments applied thereto on the longitudinal axes of such bolts and substantially parallel to the brake disc 2. Lateral or endwise movement of the various units used in positioning the brake housing member is prevented by suitable means and these means may include washers 17, each of which has an inwardly directed sleeve or hub section 18 formed thereon. One of the washers 17 is positioned at a lateral margin of the brake housing member 1 and the adapter link 6 and, of course, the bolts 10 and 11 extend therethrough so as to receive the washer 17 between the associated movable surfaces of the brake housing and its mounting means, and between the adapter link and its mounting means to prevent longitudinal movement therebetween. These washers 17 may be considered to be formed to half-spool shape and they may be made from "oilite" or other suitable self-lubricating material, for example, such as any known powdered metal bearing material which is soaked in oil or graphite composition during its manufacture. In some instances, it may even be desirable to form the washer 17 from other material although the self-lubricating metallic compositions are preferred in this embodiment of the invention. It will be noted that Fig. 2 shows that the hub sections 18 are loosely received in counterbores 19 and 20 formed in the ends of the bores 5 and 15 respectively.

As a feature of the invention, a resilient, rubber bearing sleeve or bushing 21 is received in each of the counterbores 19 and 20. These rubber bushings 21 are of such size and shape that, under no load conditions, the bushings will snugly position the members associated therewith to prevent rattling or other undesired movement thereof and take up the operating clearance provided therebetween. Furthermore, and as a special feature of the present invention, the bushings 21 are not totally confined in the counterbores 19 and 20. Thus upon brake application, the rubber bushings are adapted to flow or be otherwise displaced out of their normal positions and permit movement of the members positioned thereby to set up a metal to metal contact and have a positive brake support action. It will be realized that the brake positioning mechanism of the invention is designed so that only a minimum flow of the rubber bushings 21 is required in order to effect the desired metal contact and support for the brake means in order to position them rigidly and permit effective brake operation. However, such clearances simplify manufacture and assembly of the brake components, as well as repair of same.

Fig. 2 shows that there is an appreciable space provided radially outwardly of the sleeve portions 18 of the washers 17 into which the ends of the rubber bushings 21 can flow when a rotational torque force is set up by the brake housing 1 on the bolt 10 and consequently on the adapter link 6 and the bolt 11. The inner ends of the bushings 21 may have conventional washers 22 of slightly smaller diameter than the bushings provided therefor to aid in retaining the bushings 21 in position and to aid in preventing undesired cutting or other injury of such members, while also providing limited space for flow of the bushings thereinto. The rubber bushings 21 of the invention also aid in establishing braking clearance upon release of the brake operational means since such bushings are displaced during braking action and will revert to their normal positions, and thus aid in setting up braking clearance, when the brake control means are released.

Figure 3:
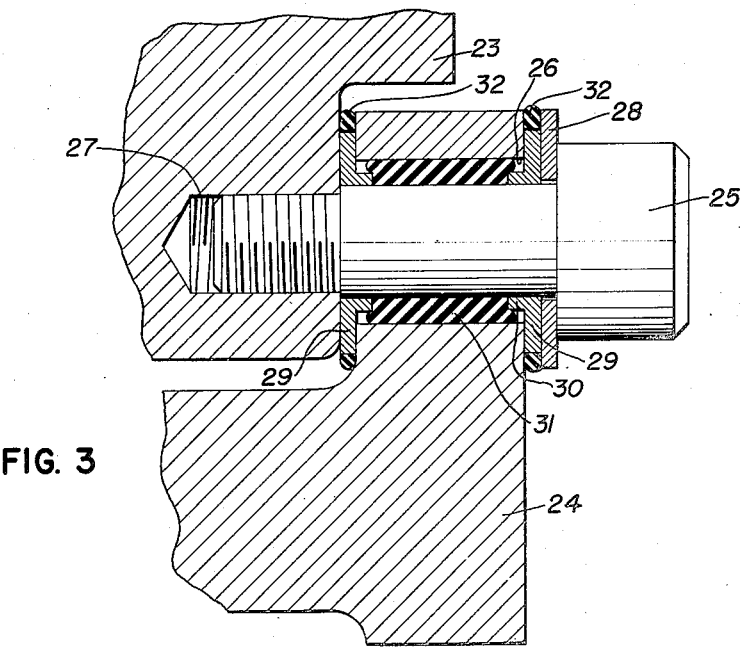
Fig. 3 is an enlarged fragmentary vertical section through a modification of the invention.

Fig. 3 shows a modification of the invention wherein a brake housing member 23 is pivotally associated with a link mounting member 24 by means of a cap screw 25 which extends through a bore 26 in the member 24 and engages with a tapped hole 27 in the member 23. The cap screw 25 has a washer 28 associated with the outer end of its shank whereas a washer 29, similar to the washer 17 is positioned adjacent each side of the member 24. These washers 29 have sleeve sections 30 provided thereon which extend, loosely, into the bore 26 formed in the member 24. A rubber bearing sleeve, or rubber bushing 31 very similar to the rubber bushing 21, is provided in this embodiment of the invention and this bushing 31 is received in the bore 26 and is abutted against the inner end sections of the sleeve 30 of the washer 29. Thus, in this instance the axially outer portions of the bushing 31 may flow axially outwardly towards the washer 29, when the brake associated with such a mounting means is actuated to occasion displacement of the rubber forming the bushing 31. One particular feature of the construction disclosed in Fig. 3 is that rubber sealing grommets or rings 32 may be positioned around the periphery of the washers 29 to aid in forming a seal therebetween to prevent entry of dirt or other foreign material into the positioning device of the invention.

Figure 4:
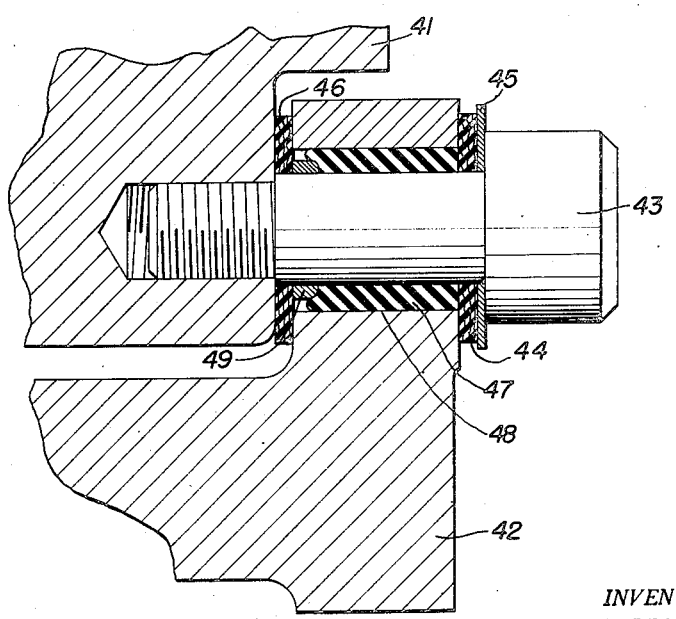
Fig. 4 is an enlarged fragmentary section of still another modification of the device of the invention.

Fig. 4 shows a construction somewhat similar to that shown in Fig. 3 and in this instance a brake housing member 41 is pivotally carried by a link mounting member 42 by means of a cap screw 43. This cap screw 43 has a rubber-fabric washer 44 associated therewith and which is forced against the member 42 by means of a metallic washer 45 which is engaged with the head of the cap screw 43. A washer 46 similar to the washer 44, is also positioned by the cap screw 43 intermediate the adjacent surfaces of the members 41 and 42, and a resilient rubber bearing sleeve or bushing 47 is carried by the main shank portion of the cap screw 43 and is positioned in a bore 48 formed in the member 42 for receiving the cap screw 43. In this construction of the invention, a metallic ring 49 is provided adjacent the inner washer 46 in the bore 48. This washer 49 is radially spaced from the bore 48 in order to provide space for flow of the rubber bushing 47 thereinto, when brake action is effected. Under no load conditions, the rubber bushing 47 will function to position the cap screw 43 snugly in the bore 48.

It will be appreciated that in referring to rubber throughout the specification and claims, any resilient material having the characteristics of rubber is included. That is, any material which is resilient and elastic may, in general, be used in practice of the invention and natural rubber, synthetic rubber, and rubber-like material may be used in forming the rubber bushings or bearings of the invention. In all instances, the bushing members will snugly position the associated means under no load conditions but will permit limited flow of the rubber to occur when brake action is effected in order to permit a metal to metal contact to be established temporarily during brake action. Use of the rubber and fabric end washers as shown in Fig. 4 is desirable in that it will permit limited longitudinal movement of the members with relation to each other on brake application and aid in distributing the stresses set up in the brake at that time.

Naturally, the members shown and described in Figs. 3 and 4 of the drawing relate to brake mounting components of the type disclosed in more detail in Figs. 1 and 2. In all events, the spot type brake of the invention will be adapted to have uniform brake action by virtue of the specialized pivotal mountings provided for the support means therefor and the support means then, in turn, will be provided with effective no-load positioning means which may comprise any form of rubber bushing disclosed in this application.

While in accord with the patent statutes, several embodiments of the invention have been illustrated and described in detail, it is to be particularly understood that the invention is not to be limited thereto or thereby, but that the scope of the invention is defined in the appended claims.

What is claimed is:

1. A spot type brake combination including a rotary disc, a C-shaped housing surrounding a periphery of the disc, hydraulic means carried by the housing and adapted to clamp on opposite sides of the disc, a link, a stationary bracket, means pivotally securing one end of the link to the housing, means pivotally securing the other end of the link to the bracket, said link allowing movement of the housing to and from the side of the disc, said combination being characterized by rubber bushings in said pivotal securing means and functioning torsionally to effect clearance between the disc and the housing upon release of the hydraulic means, and metal means carried by the pivotal securing means and providing metal to metal contact when the rubber bushings yield radially in absorbing the stopping torque on the disc.

2. A spot type brake combination including a rotary disc, a C-shaped housing surrounding a periphery of the disc, hydraulic means carried by the housing and adapted to clamp on opposite sides of the disc, a link, a stationary bracket, a bolt pivotally securing one end of the link to the housing, a bolt pivotally securing the other end of the link to the bracket, metal bushing means carried by each bolt and effecting a loose, sloppy bearing between the parts pivotally connected, and rubber bushing means carried by each bolt at the end of the metal bushing means to effect a tight but resilient fit between the parts pivotally connected, said rubber bushing means yielding torsionally without the metal bushings contacting in the movement of the housing toward and from the disc, and yielding radially to bring the metal bushings into contact in absorbing the braking torque on the disc.

CARL E. BRICKER.
DONALD D. NEFF.

REFERENCES CITED

The following references are of record in the file of this patent:

UNITED STATES PATENTS

| Number | Name | Date |
| --- | --- | --- |
| 1,871,861 | Rossman | Aug. 16, 1932 |
| 2,274,859 | Eksergian | Mar. 3, 1942 |
| 2,276,337 | Pflager | Mar. 17, 1942 |
| 2,308,967 | Kuss | Jan. 19, 1943 |
| 2,334,024 | Mystrom et al. | Nov. 9, 1943 |
| 2,351,041 | Hawley | June 13, 1944 |
| 2,400,238 | Leighton | May 14, 1946 |